(12) United States Patent
Koh et al.

(10) Patent No.: US 8,871,384 B2
(45) Date of Patent: Oct. 28, 2014

(54) NON-AQUEOUS ELECTROLYTIC SOLUTION

(75) Inventors: Meiten Koh, Settsu (JP); Hideo Sakata, Settsu (JP); Hitomi Nakazawa, Settsu (JP); Michiru Tanaka, Settsu (JP); Akiyoshi Yamauchi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 612 days.

(21) Appl. No.: 12/525,685

(22) PCT Filed: Feb. 5, 2008

(86) PCT No.: PCT/JP2008/051817

§ 371 (c)(1),
(2), (4) Date: Aug. 4, 2009

(87) PCT Pub. No.: WO2008/096729

PCT Pub. Date: Aug. 14, 2008

(65) Prior Publication Data

US 2010/0062344 A1 Mar. 11, 2010

(30) Foreign Application Priority Data

Feb. 6, 2007 (JP) .................................. 2007-026922

(51) Int. Cl.
| | | |
|---|---|---|
| *H01M 6/14* | (2006.01) | |
| *H01M 10/0569* | (2010.01) | |
| *H01M 10/0567* | (2010.01) | |
| *H01M 10/0568* | (2010.01) | |
| *H01M 4/131* | (2010.01) | |
| *H01M 4/505* | (2010.01) | |
| *H01M 4/525* | (2010.01) | |
| *H01M 10/052* | (2010.01) | |
| *H01M 4/02* | (2006.01) | |
| *H01M 10/42* | (2006.01) | |

(52) U.S. Cl.
CPC ...... *H01M 10/0569* (2013.01); *H01M 10/0567* (2013.01); *H01M 10/0568* (2013.01); *H01M 4/131* (2013.01); *H01M 4/505* (2013.01); *H01M 4/525* (2013.01); *H01M 2300/0034* (2013.01); *H01M 2300/004* (2013.01); *H01M 2300/0042* (2013.01); *H01M 2300/0037* (2013.01); *H01M 2220/20* (2013.01); *H01M 2004/028* (2013.01); *H01M 10/052* (2013.01); *H01M 10/4235* (2013.01); *Y02E 60/122* (2013.01); *Y02T 10/7011* (2013.01)
USPC .......... 429/199; 429/200; 429/330; 429/332; 429/333; 429/334; 429/224; 429/221; 429/231.5; 567/335; 567/231.1; 567/231.3; 567/231.2; 567/223; 252/62.2

(58) Field of Classification Search
CPC ...................... H01M 10/0567; H01M 10/0568; H01M 10/0569; H01M 10/052; H01M 2300/0034; H01M 2300/0037; H01M 2300/004; H01M 2300/0042; H01M 4/131; H01M 4/505; H01M 4/525; H01M 2004/02; H01M 2004/028; H01M 2220/20
USPC ......... 429/199, 200, 223, 224, 330, 332, 333, 429/334, 335, 231.1, 231.3, 231.2, 221, 429/231.5; 252/62.2
See application file for complete search history.

(56) References Cited

U.S. PATENT DOCUMENTS

| | | | |
|---|---|---|---|
| 6,010,806 A | 1/2000 | Yokoyama et al. | |
| 2004/0038133 A1 | 2/2004 | Yamaguchi et al. | |
| 2004/0146778 A1 | 7/2004 | Lee et al. | |
| 2005/0031963 A1 | 2/2005 | Im et al. | |
| 2006/0127777 A1* | 6/2006 | Ihara et al. ................... | 429/326 |
| 2009/0086408 A1 | 4/2009 | Koh et al. | |
| 2009/0253044 A1* | 10/2009 | Nogi et al. ................... | 429/326 |
| 2009/0253048 A1* | 10/2009 | Shima .......................... | 429/338 |

FOREIGN PATENT DOCUMENTS

| | | | |
|---|---|---|---|
| CN | 1479400 A | 3/2004 | |
| JP | 8-37024 A | 2/1996 | |
| JP | 09-063644 A | 3/1997 | |
| JP | 9-97627 A | 4/1997 | |
| JP | 10-112334 A | 4/1998 | |
| JP | 10-233345 A | 9/1998 | |
| JP | 10-247519 A | 9/1998 | |
| JP | 11-26015 A | 1/1999 | |
| JP | 11-307123 A | 11/1999 | |
| JP | 2000-294281 A | 10/2000 | |
| JP | 2001-52737 A | 2/2001 | |
| JP | 2001-256983 A | 9/2001 | |
| JP | 2003-132944 A | 5/2003 | |
| JP | 2004-14134 A | 1/2004 | |
| KR | 10-0508932 B1 | 8/2005 | |
| KR | 10-0657225 B1 | 12/2006 | |
| WO | 2006/106655 A1 | 10/2006 | |
| WO | WO 2006/132372 | * | 12/2006 |
| WO | WO 2007/043526 | * | 4/2007 |

\* cited by examiner

*Primary Examiner* — Laura Weiner
(74) *Attorney, Agent, or Firm* — Sughrue Mion, PLLC

(57) ABSTRACT

There is provided a non-aqueous electrolytic solution comprising an electrolyte salt, a specific fluorine-containing solvent and a fluorine-containing cyclic carbonate represented by the formula (A1):

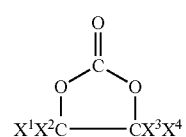

(A1)

wherein $X^1$ to $X^4$ are the same or different and each is —H, —F, —$CF_3$, —$CHF_2$, —$CH_2F$, —$CF_2CF_3$, —$CH_2CF_3$ or —$CH_2OCH_2CF_2CF_3$; at least one of $X^1$ to $X^4$ is —F, —$CF_3$, —$CF_2CF_3$, —$CH_2CF_3$ or —$CH_2OCH_2CF_2CF_3$, and the non-aqueous electrolytic solution has further excellent noncombustibility and is suitable for lithium secondary batteries.

6 Claims, No Drawings

NON-AQUEOUS ELECTROLYTIC SOLUTION

TECHNICAL FIELD

The present invention relates to a non-aqueous electrolytic solution suitable for lithium secondary batteries.

BACKGROUND ART

Carbonates such as ethylene carbonate, propylene carbonate and dimethyl carbonate are generally used as a solvent for dissolving an electrolyte salt for a non-aqueous electrolytic solution for lithium secondary batteries. However these hydrocarbon carbonates are low in a flash point and have high combustibility, and therefore, improvement in noncombustibility of a non-aqueous electrolytic solution is an important problem to be solved for securing safety especially in the cases of large size lithium secondary batteries for hybrid cars and distributed power source.

In order to improve noncombustibility of a non-aqueous electrolytic solution without lowering its performance, addition of a fluorine-containing solvent has been proposed (JP8-37024A, JP9-97627A, JP11-26015A, JP2000-294281A, JP2001-52737A, JP11-307123A and JP10-112334A).

DISCLOSURE OF INVENTION

It is an object of the present invention to provide a non-aqueous electrolytic solution being further excellent in noncombustibility and suitable for lithium secondary batteries.

The present invention relates to a non-aqueous electrolytic solution comprising:

(I) a solvent for dissolving an electrolyte salt comprising (A) a fluorine-containing cyclic carbonate represented by the formula (A1):

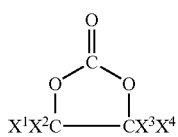

(A1)

wherein $X^1$ to $X^4$ are the same or different and each is —H, —F, —CF$_3$, —CHF$_2$, —CH$_2$F, —CF$_2$CF$_3$, —CH$_2$CF$_3$ or —CH$_2$OCH$_2$CF$_2$CF$_3$; at least one of $X^1$ to $X^4$ is —F, —CF$_3$, —CF$_2$CF$_3$, —CH$_2$CF$_3$ or —CH$_2$OCH$_2$CF$_2$CF$_3$, and (B) at least one fluorine-containing solvent selected from the group consisting of (B1) a fluorine-containing chain ether, (B2) a fluorine-containing chain ester and (B3) a fluorine-containing chain carbonate, and (II) an electrolyte salt.

It is preferable that the above-mentioned fluorine-containing cyclic carbonate (A) is at least one selected from the group consisting of:

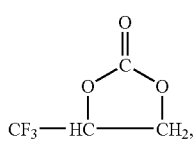

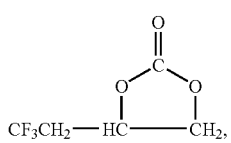

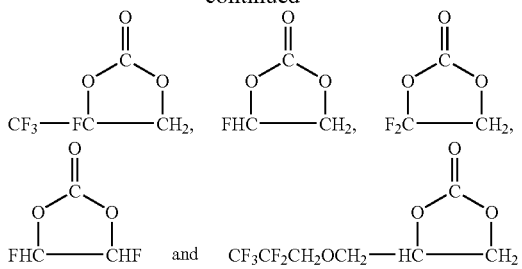

It is preferable that the above-mentioned fluorine-containing solvent (B) is at least one selected from the group consisting of: a fluorine-containing chain ether (B1) represented by the formula (B1):

wherein Rf$^1$ is a fluorine-containing alkyl group having 3 to 6 carbon atoms, Rf$^2$ is a fluorine-containing alkyl group having 2 to 6 carbon atoms, and Rf$^1$ and Rf$^2$ may be the same or different, a fluorine-containing chain ester (B2) represented by the formula (B2):

wherein Rf$^3$ and Rf$^4$ are the same or different, Rf$^3$ is a fluorine-containing alkyl group having 1 to 2 carbon atoms, Rf$^4$ is a fluorine-containing alkyl group having 1 to 4 carbon atoms, and a fluorine-containing chain carbonate (B3) represented by the formula (B3):

wherein Rf$^5$ and Rf$^6$ are the same or different, each is an alkyl group or fluorine-containing alkyl group having 1 to 4 carbon atoms, at least either Rf$^5$ or Rf$^6$ is a fluorine-containing alkyl group.

It is preferable that the above-mentioned solvent (I) for dissolving an electrolyte salt comprises 10 to 60% by volume of the fluorine-containing cyclic carbonate (A) and 40 to 90% by volume of at least one fluorine-containing solvent (B) selected from the group consisting of the fluorine-containing chain ether (B1), the fluorine-containing chain ester (B2) and the fluorine-containing chain carbonate (B3), based on the whole solvent (I).

It is preferable that the above-mentioned electrolyte salt (II) is at least one selected from the group consisting of LiPF$_6$, LiN(SO$_2$CF$_3$)$_2$ and LiN(SO$_2$CF$_2$CF$_3$)$_2$.

It is preferable that the above-mentioned non-aqueous electrolytic solution is for lithium secondary batteries.

It is preferable that the above-mentioned non-aqueous electrolytic solution is for large size lithium secondary batteries used for hybrid cars and distributed power source.

The present invention further relates to a lithium secondary battery comprising a positive electrode, a negative electrode, a separator and the above-mentioned non-aqueous electrolytic solution, in which an active material used on the positive electrode is at least one compound oxide selected from the group consisting of cobalt compound oxides, nickel compound oxides, manganese compound oxides, iron compound oxides and vanadium compound oxides.

BEST MODE FOR CARRYING OUT THE INVENTION

The non-aqueous electrolytic solution of the present invention comprises the solvent (I) for dissolving an electrolyte salt comprising specific components and the electrolyte salt (II).

The solvent (I) for dissolving an electrolyte salt comprises the fluorine-containing cyclic carbonate (A) and at least one fluorine-containing solvent (B) selected from the group consisting of the fluorine-containing chain ether (B1), the fluorine-containing chain ester (B2) and the fluorine-containing chain carbonate (B3). Each of the solvent components (A) and (B) is explained below.

(A) Fluorine-Containing Cyclic Carbonate:

When the fluorine-containing cyclic carbonate (A) is contained, an action of increasing a dielectric constant and an effect of improving oxidation resistance can be obtained.

The fluorine-containing cyclic carbonate (A) is represented by the formula (A1):

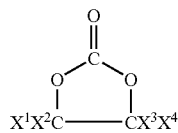

(A1)

wherein $X^1$ to $X^4$ are the same or different and each is —H, —F, —CF$_3$, —CHF$_2$, —CH$_2$F, —CF$_2$CF$_3$, —CH$_2$CF$_3$ or —CH$_2$OCH$_2$CF$_2$CF$_3$; at least one of $X^1$ to $X^4$ is —F, —CF$_3$, —CF$_2$CF$_3$, —CH$_2$CF$_3$ or —CH$_2$OCH$_2$CF$_2$CF$_3$.

Each of $X^1$ to $X^4$ is —H, —F, —CF$_3$, —CHF$_2$, —CH$_2$F, —CF$_2$CF$_3$, —CH$_2$CF$_3$ or —CH$_2$OCH$_2$CF$_2$CF$_3$, and from the viewpoint of satisfactory dielectric constant and viscosity and excellent compatibility with other solvents, —F, —CF$_3$ and —CH$_2$CF$_3$ are preferred.

In the formula (A1), all of $X^1$ to $X^4$ or only one thereof may be —F, —CF$_3$, —CF$_2$CF$_3$, —CH$_2$CF$_3$ or —CH$_2$OCH$_2$CF$_2$CF$_3$. Especially from the viewpoint of satisfactory dielectric constant and oxidation resistance, it is preferable that one or two of them is replaced.

The fluorine content of fluorine-containing cyclic carbonate (A) is preferably 15 to 50% by mass, more preferably 30 to 50% by mass, from the viewpoint of satisfactory dielectric constant and oxidation resistance.

Among the fluorine-containing cyclic carbonates (A), those mentioned below are preferred from the viewpoint that especially excellent characteristics such as high dielectric constant and high withstanding voltage are exhibited and solubility of an electrolyte salt and decrease in internal resistance are satisfactory, thereby improving characteristics of the lithium secondary battery of the present invention.

Examples of the fluorine-containing cyclic carbonate (A) having high withstanding voltage and assuring good solubility of an electrolyte salt are, for instance,

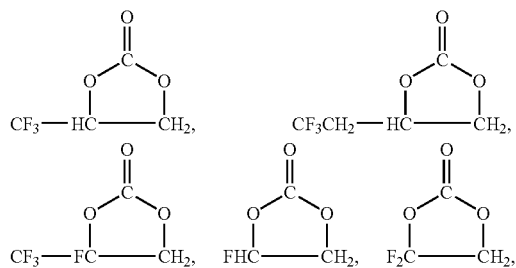

-continued

and the like.

Examples of other fluorine-containing cyclic carbonates (A) which can be used are:

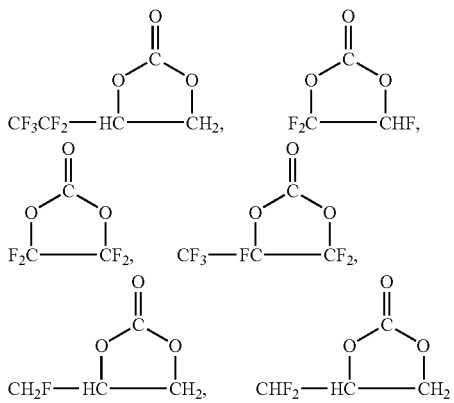

and the like.

(B) At least one fluorine-containing solvent selected from the group consisting of fluorine-containing chain ether, fluorine-containing chain ester and fluorine-containing chain carbonate:

When the fluorine-containing solvent (B) is contained, an action of making the electrolytic solution to have flame retardance, an action of improving characteristics at low temperature and an effect of improving oxidation resistance can be obtained.

Examples of the fluorine-containing chain ether (B1) are compounds described in JP8-37024A, JP9-97627A, JP11-26015A, JP2000-294281A, JP2001-52737A and JP11-307123A.

Particularly preferred is the fluorine-containing chain ether (B1) represented by the formula (B1):

$Rf^1ORf^2$ wherein $Rf^1$ is a fluorine-containing alkyl group having 3 to 6 carbon atoms, $Rf^2$ is a fluorine-containing alkyl group having 2 to 6 carbon atoms, and $Rf^1$ and $Rf^2$ may be the same or different, from the viewpoint of satisfactory compatibility with other solvents and proper boiling point.

Examples of $Rf^1$ are CHF$_2$CF$_2$CH$_2$—, CHF$_2$CF$_2$CF$_2$CH$_2$—, CHF$_2$CF$_2$CF$_2$CF$_2$CH$_2$—, CF$_3$CF$_2$CH$_2$—, CF$_3$CHFCF$_2$CH$_2$—, CHF$_2$CF(CF$_3$)CH$_2$— and CF$_3$CF$_2$CH$_2$CH$_2$—, and examples of $Rf^2$ are —CF$_2$CF$_2$H, —CF$_2$CHFCF$_3$, —CF$_2$CF$_2$CHF$_2$, —CH$_2$CH$_2$CF$_3$, —CH$_2$CHFCF$_3$ and —CH$_2$CH$_2$CF$_2$CF$_3$. It is particularly preferable that $Rf^1$ is a fluorine-containing alkyl group having 3 to 4 carbon atoms and $Rf^2$ is a fluorine-containing alkyl group having 2 to 3 carbon atoms, from the viewpoint of satisfactory ionic conductivity.

Examples of the fluorine-containing chain ether (B1) are CHF$_2$CF$_2$CH$_2$OCF$_2$CF$_2$H, CF$_3$CF$_2$CH$_2$OCF$_2$CF$_2$H, CHF$_2$CF$_2$CH$_2$OCF$_2$CHFCF$_3$, CF$_3$CF$_2$CH$_2$OCF$_2$CHFCF$_3$, CHF$_2$CF$_2$CH$_2$OCH$_2$CHFCF$_3$ and CF$_3$CF$_2$CH$_2$OCH$_2$CHFCF$_3$, and particularly from the viewpoint of satisfactory compatibility with other solvents and satisfactory rate characteristics, $CHF_2CF_2CH_2OCF_2CF_2H$, $CF_3CF_2CH_2OCF_2CF_2H$, $CHF_2CF_2CH_2OCF_2CHFCF_3$ and $CF_3CF_2CH_2OCF_2CHFCF_3$ are especially preferred.

Preferred fluorine-containing chain ester (B2) is a fluorine-containing chain ester (B2) represented by the formula (B2):

$$Rf^3COORf^4$$

wherein $Rf^3$ and $Rf^4$ are the same or different, $Rf^3$ is a fluorine-containing alkyl group having 1 to 2 carbon atoms, $Rf^4$ is a fluorine-containing alkyl group having 1 to 4 carbon atoms, since it is high in flame retardancy and has satisfactory compatibility with other solvents.

Examples of $Rf^3$ are $CF_3$—, $CF_3CF_2$—, $CHF_2CF_2$—, $CHF_2$—, $CH_3CF_2$— and $CF_3CH_2$—, and particularly from the viewpoint of satisfactory rate characteristics, $CF_3$— and $CF_3CF_2$— are especially preferred.

Examples of $Rf^4$ are —$CF_3$, —$CF_2CF_3$, —$CH_2CF_3$, —$CH_2CH_2CF_3$, —$CH(CF_3)_2$, —$CH_2CF_2CHFCF_3$, —$CH_2CF_2CF_3$, —$CH_2CF_2CHF_2$, —$CH_2CH_2CF_2CF_3$ and —$CH_2CF_2CF_2CF_3$, and particularly from the viewpoint of satisfactory compatibility with other solvents, —$CH_2CF_3$, —$CH_2CF_2CF_3$, —$CH(CF_3)_2$ and —$CH_2CF_2CHF_2$ are especially preferred.

Examples of the fluorine-containing chain ester (B2) are $CF_3COOCH_2CF_3$, $CF_3COOCH_2CH_2CF_3$, $CF_3COOCH_2CF_2CF_3$, $CF_3COOCH_2CF_2CHF_2$ and $CF_3COOCH(CF_3)_2$, and particularly from the viewpoint of satisfactory compatibility with other solvents and satisfactory rate characteristics, $CF_3COOCH_2CF_2CF_3$, $CF_3COOCH_2CF_2CHF_2$, $CF_3COOCH_2CF_3$ and $CF_3COOCH(CF_3)_2$ are especially preferred.

Preferred fluorine-containing chain carbonate (B3) is a fluorine-containing chain carbonate (B3) represented by the formula (B3):

$$Rf^5OCOORf^6$$

wherein $Rf^5$ and $Rf^6$ are the same or different, each is an alkyl group or fluorine-containing alkyl group having 1 to 4 carbon atoms, at least either $Rf^5$ or $Rf^6$ is a fluorine-containing alkyl group, from the viewpoint of high flame retardancy and satisfactory rate characteristics.

Examples of $Rf^5$ and $Rf^6$ are $CF_3$—, $CF_3CF_2$—, $(CF_3)_2CH$—, $CF_3CH_2$—, $CF_3CF_2CH_2$—, $CHF_2CF_2CH_2$— and $CF_3CHFCF_2CH_2$—, and particularly from the viewpoint of proper viscosity, satisfactory compatibility with other solvents and satisfactory rate characteristics, $CF_3CH_2$— and $CF_3CF_2CH_2$— are especially preferred.

Examples of the fluorine-containing chain carbonate (B3) are $CF_3CH_2OCOOCH_2CF_3$, $CF_3CF_2CH_2OCOOCH_2CF_2CF_3$, $CF_3CF_2CH_2OCOOCH_3$, $CF_3CH_2OCOOCH_3$, $CF_3CH_2OCOOCH_2CH_3$, $CF_3CF_2CH_2OCOOCH_2CH_3$ and $CHF_2CF_2CH_2OCOOCH_2CF_2CHF_2$, and particularly from the viewpoint of proper viscosity, high flame retardancy, satisfactory compatibility with other solvents and satisfactory rate characteristics, $CF_3CH_2OCOOCH_2CF_3$, $CF_3CF_2CH_2OCOOCH_3$, $CF_3CH_2OCOOCH_3$, $CF_3CF_2CH_2OCOOCH_2CF_2CF_3$ and $CHF_2CF_2CH_2OCOOCH_2CF_2CHF_2$ are especially preferred. Also, there can be exemplified compounds described, for example, in JP6-21992A, JP2000-327634A and JP2001-256983A.

Among the fluorine-containing solvents (B), the fluorine-containing chain ether (B1) and the fluorine-containing chain ester (B2) are preferred from the viewpoint of proper viscosity, satisfactory solubility of an electrolyte salt and satisfactory rate characteristics.

The fluorine-containing chain ether (B1), the fluorine-containing chain ester (B2) and the fluorine-containing chain carbonate (B3) may be used alone or may be used in combination thereof. In the case of combination use, a combination of the fluorine-containing chain ether (B1) and the fluorine-containing chain ester (B2) and a combination of the fluorine-containing chain ether (B1) and the fluorine-containing chain carbonate (B3) are preferred from the viewpoint of low viscosity and satisfactory compatibility with other solvents.

In the non-aqueous electrolytic solution of the present invention, it is preferable that the fluorine-containing cyclic carbonate (A) is contained in an amount of 10 to 60% by volume based on the whole solvent (I) for dissolving an electrolyte salt. When the amount of fluorine-containing cyclic carbonate (A) is smaller, load characteristics tend to be decreased due to lowering of dielectric constant. It is further preferable that the fluorine-containing cyclic carbonate (A) is contained in an amount of 15 to 60% by volume from the viewpoint of satisfactory flame retardancy and satisfactory rate characteristics.

In the non-aqueous electrolytic solution of the present invention, it is preferable that at least one fluorine-containing solvent (B) selected from the group consisting of the fluorine-containing chain ether (B1), the fluorine-containing chain ester (B2) and the fluorine-containing chain carbonate (B3) is contained in an amount of 40 to 90% by volume based on the whole solvent (I) for dissolving an electrolyte salt. When the amount of fluorine-containing chain ether (B1), fluorine-containing chain ester (B2) or fluorine-containing chain carbonate (B3) is smaller, low temperature characteristics tend to lower, and when the amount is larger, phase separation occurs and dielectric constant is decreased, and therefore, discharge capacity tends to be decreased. It is further preferable that the fluorine-containing solvent (B) is contained in an amount of 40 to 75% by volume, especially 40 to 70% by volume, from the viewpoint of satisfactory flame retardancy and satisfactory low temperature characteristics. The amount of fluorine-containing solvent (B) is a total amount of fluorine-containing chain ether (B1), fluorine-containing chain ester (B2) and fluorine-containing chain carbonate (B3).

In the present invention, examples of the fluorine-containing solvent (C) which can be used, if necessary, as an optional component are a fluorine-containing lactone (C1), at least one fluorine-containing solvent (C2) selected from the group consisting of monofluorobenzene, hexafluorobenzene, difluorobenzene, trifluorobenzene, tetrafluorobenzene and pentafluorobenzene, and a fluorine-containing sulfolane derivative (C3). In this case, it is preferable that the fluorine-containing solvent (C) is contained in such an amount that the effects (noncombustibility and oxidation resistance) given by the fluorine-containing cyclic carbonate (A) and at least one fluorine-containing solvent (B) selected from the group consisting of the fluorine-containing chain ether (B1), the fluorine-containing chain ester (B2) and the fluorine-containing chain carbonate (B3) are not impaired. This amount is preferably from 0.5 to 20% by volume based on the whole solvents.

Examples of fluorine-containing lactone (C1) are, for instance, those represented by the formula (C1A):

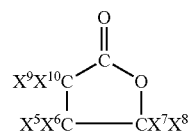

(C1A)

wherein $X^5$ to $X^{10}$ are the same or different and each is —H, —F, —Cl, —CH$_3$, or a fluorine-containing alkyl group; at least one of $X^5$ to $X^{10}$ is a fluorine-containing alkyl group.

The fluorine-containing alkyl group in $X^5$ to $X^{10}$ is —CH$_2$F, —CHF$_2$, —CF$_3$, —CH$_2$CF$_3$ or —CH$_2$CF$_2$CF$_3$ and from the viewpoint of satisfactory withstanding voltage, —CF$_3$, —CH$_2$CF$_3$ and —CH$_2$CF$_2$CF$_3$ are preferred.

All of $X^5$ to $X^{10}$ or only one thereof may be a fluorine-containing alkyl group. From the viewpoint of satisfactory solubility of an electrolyte salt, it is preferable that 1 to 3, especially 1 to 2 of them is replaced The position of substitution by fluorine-containing alkyl group is not limited particularly, and from the viewpoint of good synthesis yield, it is preferable that $X^7$ and/or $X^8$, especially $X^7$ or $X^8$ is a fluorine-containing alkyl group, especially —CF$_3$—CH$_2$CF$_3$ or —CH$_2$CF$_2$CF$_3$. In $X^5$ to $X^{10}$, a group other than fluorine-containing alkyl group is —H, —F, —Cl or —CH$_3$, and from the viewpoint of satisfactory solubility of an electrolyte salt, —H is preferred.

Examples of fluorine-containing lactone (C1) other than those represented by the above-mentioned formula (C1A) are, for instance, fluorine-containing lactones represented by the formula (C1B):

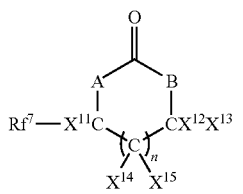
(C1B)

wherein either A or B is $CX^{16}X^{17}$ ($X^{16}$ and $X^{17}$ are the same or different and each is —H, —F, —Cl, —CF$_3$, —CH$_3$, or an alkyl group in which hydrogen atom may be replaced by halogen atom and hetero atom may be contained in its chain), and another one is oxygen atom; $Rf^7$ is a fluorine-containing ether group, a fluorine-containing alkoxy group or a fluorine-containing alkyl group having two or more carbon atoms; $X^{11}$ and $X^{12}$ are the same or different and each is —H, —F, —Cl, —CF$_3$ or —CH$_3$; each of $X^{13}$ to $X^{15}$ is —H, —F, —Cl or an alkyl group in which hydrogen atom may be replaced by halogen atom and hetero atom may be contained in its chain; n is 0 or 1.

Examples of preferred fluorine-containing lactones (C1) represented by the formula (C1B) are those having 5-membered ring structure represented by the formula (C1B-1):

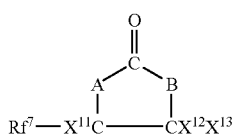
(C1B-1)

wherein A, B, $Rf^7$, $X^{11}$, $X^{12}$ and $X^{13}$ are as defined in the formula (C1B), from the viewpoint of easy synthesis and satisfactory chemical stability.

Depending on a combination of A and B, there are two fluorine-containing lactones (C1B) represented by the formula (C1B-1), namely, one is a fluorine-containing lactone (C1) represented by the formula (C1B-1-1):

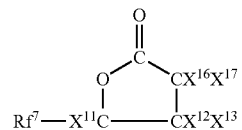
(C1B-1-1)

wherein $Rf^7$, $X^{11}$, $X^{12}$, $X^{13}$, $X^{16}$ and $X^{17}$ are as defined in the formula (C1B-1),
and another one is a fluorine-containing lactone (C1) represented by the formula (C1B-1-2):

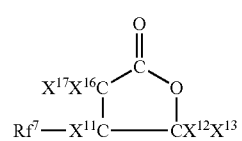
(C1B-1-2)

wherein $Rf^7$, $X^{11}$, $X^{12}$, $X^{13}$, $X^{16}$ and $X^{17}$ are as defined in the formula (C1B-1).

Among these, from the viewpoint that especially excellent characteristics such as high dielectric constant and high withstanding voltage can be exhibited and solubility of an electrolyte salt and decrease in internal resistance are satisfactory, thereby improving characteristics of the electrolytic solution in the present invention,

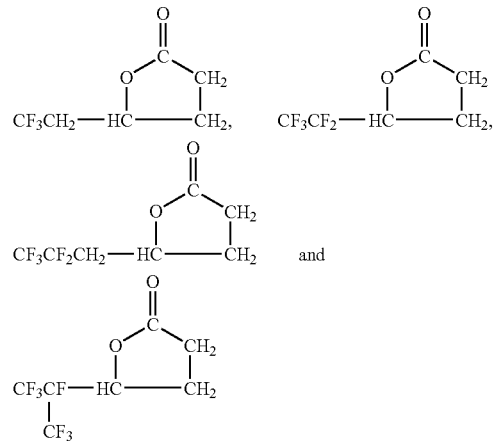

are preferred.

Examples of other fluorine-containing lactones (C1) which can be used are:

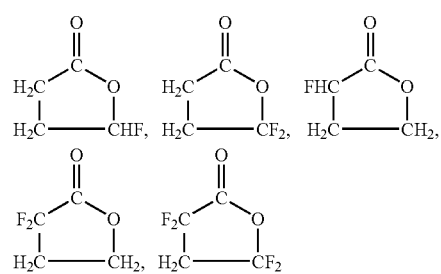

and the like.

At least one fluorine-containing solvent (C2) selected from the group consisting of monofluorobenzene, hexafluorobenzene, difluorobenzene, trifluorobenzene, tetrafluorobenzene and pentafluorobenzene is preferred from the viewpoint of inhibition of gas generation during storage at high temperature since a film can be formed on the electrode.

Examples of the fluorine-containing sulfolane derivative (C3) are those described in JP2003-132994A, and particularly,

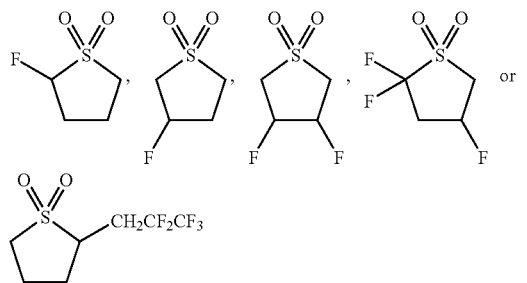

is preferred.

Non-fluorine-containing solvents such as hydrocarbon carbonate solvents, nitrile solvents, lactone solvents and ester solvents which are described in WO 2006/106655 may be contained in the solvent (I) for dissolving an electrolyte salt in such an amount that the effects (noncombustibility and oxidation resistance) given by the fluorine-containing cyclic carbonate (A) and at least one fluorine-containing solvents (B) selected from the group consisting of the fluorine-containing chain ether (B1), the fluorine-containing chain ester (B2) and the fluorine-containing chain carbonate (B3) are not impaired. However, it is preferable that such solvents are not contained in the solvent (I) from the viewpoint of noncombustibility and oxidation resistance. It is preferable that the amount of such a non-fluorine-containing solvent is not more than 10% by volume based on the whole solvent (I) for dissolving an electrolyte salt. When the amount of non-fluorine-containing solvent is larger than that, there is a tendency that safety and oxidation resistance are lowered. The amount is further preferably not more than 5% by volume, especially preferably not more than 3% by volume, from the viewpoint of safety and oxidation resistance.

Next, the electrolyte salt (II) is explained.

Examples of the electrolyte salt (II) to be used on the non-aqueous electrolytic solution of the present invention are $LiBF_4$, $LiAsF_6$, $LiClO_4$, $LiPF_6$, $LiBF_4$, $LiN(SO_2CF_3)_2$, $LiN(SO_2C_2F_5)_2$ and a combination thereof, and from the viewpoint of improving cycle life, at least one selected from the group consisting of $LiPF_6$, $LiN(SO_2CF_3)_2$ and $LiN(SO_2C_2F_5)_2$ is preferred.

The concentration of the electrolyte salt (II) in the solvent (I) for dissolving the electrolyte salt need be not less than 0.6 mole/liter, further not less than 0.8 mole/liter in order to achieve battery characteristics demanded. The upper limit of the concentration is usually 1.5 mole/liter though it depends on kind of the solvent (I) for dissolving the electrolyte salt.

Since the electrolytic solution of the present invention is comprised of the components described above, it is more excellent in noncombustibility. Also, according to the electrolytic solution of the present invention, oxidation resistance can be expected to be improved since oxidation potential is improved. Further, in the electrolytic solution of the present invention, it can be expected that phase separation hardly occurs even at low temperature, thereby keeping the solution homogeneous, heat resistance is excellent and solubility of the electrolyte salt is high.

The electrolytic solution of the present invention is suitable for lithium secondary batteries because of excellent noncombustibility thereof, and specifically in a lithium secondary battery comprising a positive electrode, a negative electrode, a separator and the electrolytic solution of the present invention, it is preferable that an active material of a positive electrode is at least one selected from the group consisting of cobalt compound oxides, nickel compound oxides, manganese compound oxides, iron compound oxides and vanadium compound oxides because secondary batteries having high energy density and high output are provided. Example of cobalt compound oxide is $LiCoO_2$, example of nickel compound oxide is $LiNiO_2$, and example of manganese compound oxide is $LiMnO_2$. Also, compound oxides of CoNi, CoMn, NiMn and NiCoMn represented by $LiCo_xNi_{1-x}O_2$ ($0<x<1$), $LiCO_xMn_{1-x}O_2$ ($0<x<1$), $LiNi_xMn_{1-x}O_2$ ($0<x<1$), $LiNi_xMn_{2-x}O_4$ ($0<x<2$), and $LiNi_{1-x-y}Co_xMn_yO_2$ ($0<x<1$, $0<y<1$, $0<x+y<1$) may be used. In these lithium-containing compound oxides, a part of metal elements such as Co, Ni and Mn may be replaced by at least one metal element such as Mg, Al, Zr, Ti and Cr.

Examples of iron compound oxide are $LiFeO_2$ and $LiFePO_4$, and example of vanadium compound oxide is $V_2O_5$.

When using a nickel compound oxide, capacity can be increased more as compared with other oxides, but there is higher danger as compared with cobalt compound oxides. However, when using the electrolytic solution of the present invention assuring high safety, even in the case of nickel compound oxides, improvement in safety can be expected. Also, when manganese compound oxides, iron compound oxides and vanadium compound oxides are used, energy density is decreased but safety is improved as compared with cobalt compound oxides. However, in the case of usual electrolytic solution, firing or bursting occurs by rapid or excessive over-charging or by impact at high temperature. On the contrary, safety can be further improved in the case of the electrolytic solution of the present invention assuring high safety. Further, cobalt compound oxides are excellent in balance between safety and capacity as compared with other compound oxides, and by the use of the electrolytic solution of the present invention assuring high safety, further improvement in safety can be expected.

In the present invention, especially for the uses on large size lithium secondary batteries for hybrid cars and distributed power source, since high output is demanded, it is preferable that particles of an active material for a positive electrode mainly comprise secondary particles, and an average particle size of secondary particles is not more than 40 μm and fine particles having an average primary particle size of not more than 1 μm are contained in an amount of 0.5 to 7.0% by volume.

When fine particles having an average primary particle size of not more than 1 μm are contained, an area thereof coming into contact with an electrolytic solution is increased and lithium ion can be scattered more rapidly between the electrode and the electrolytic solution, thereby enabling output performance to be improved.

Examples of an active material to be used on a negative electrode in the present invention are carbon materials, and in addition, metallic oxides and metallic nitrides to which lithium ion can be inserted. Examples of carbon materials are natural graphite, artificial graphite, pyrocarbon, coke, meso-carbon microbeads, carbon fiber, activated carbon and pitchcoated graphite. Examples of metallic oxides to which lithium ion can be inserted are tin- or silicon-containing metallic compounds, for example, tin oxide and silicon oxide, and examples of metallic nitrides are $Li_{2.6}Co_{0.4}N$, etc.

A separator which can be used in the present invention is not limited particularly, and examples thereof are microporous polyethylene film, microporous polypropylene film, microporous ethylene-propylene copolymer film, microporous polypropylene/polyethylene two-layered film, microporous polypropylene/polyethylene/polypropylene three-layered film, etc.

The electrolytic solution of the present invention is non-flammable, and therefore, is useful especially as an electrolytic solution for the above-mentioned large size lithium secondary batteries for hybrid cars and distributed power source, and in addition, is useful as a non-aqueous electrolytic solution for small size lithium ion batteries, an electrolytic solution for aluminum electrolytic capacitor and an electrolytic solution for an electric double layer capacitor.

EXAMPLE

The present invention is then explained by means of examples, but the present invention is not limited to them.

The methods of measurement adopted in the present invention are as follows.

1) NMR: AC-300 available from BRUKER CO., LTD. is used.

$^{19}$F-NMR:

Measuring condition: 282 MHz (trichlorofluoromethane=0 ppm)

$^1$H-NMR:

Measuring condition: 300 MHz (tetramethylsilane=0 ppm)

2) IR analysis: Measurement is carried out at room temperature with a Fourier-transform infrared spectrophotometer 1760X available from Perkin Elmer Co., Ltd.

3) Fluorine content:

The fluorine content (% by mass) is obtained by burning 10 mg of a sample by an oxygen flask combustion method, absorbing cracked gas in 20 ml of de-ionized water and then measuring a fluorine ion concentration in the fluorine ion-containing solution through a fluoride-ion selective electrode method (using a fluorine ion meter model 901 available from Orion).

Synthesis Example 1

Component A1

Into a 3-liter autoclave were poured 800 g (7.14 mol) of 3,3,3-trifluoromethylepoxypropane, 18.8 g (0.2 mol) of LiBr and 600 ml of N-methyl-2-pyrrolidone. After decreasing the inside pressure (100 mmHg) on ice bath, $CO_2$ was introduced. Thereafter, while heating up to 100° C., $CO_2$ was introduced until the inside pressure reached 1.2 MPa, and reaction was continued with stirring until decreasing of the inside pressure stopped. After completion of the reaction, the reaction solution was cooled and washed with 1 mol/liter of an aqueous solution of HCl for separation of the solution. After that, refining by distillation was carried out, and 548 g (3.5 mol) of a fluorine-containing cyclic carbonate (A1):

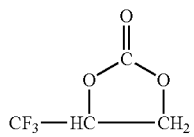

was obtained (yield 49%).

According to $^{19}$F-NMR and $^1$H-NMR analysis, it was confirmed that this product was the fluorine-containing cyclic carbonate (A1) having the above-mentioned structure.

$^{19}$F-NMR: (neat): −79.1 to −83.2 ppm (3F)

$^1$H-NMR: (neat): 4.44 to 4.61 ppm (2H), 4.91 ppm (1H)

IR: (KBr): 1,801 cm$^{-1}$

The fluorine content of this fluorine-containing cyclic carbonate (A1) was 36.5% by mass.

Synthesis Example 2

Component A2

Into a 3-liter autoclave were poured 174 g (3.0 mol) of allyl alcohol, 49.2 g (0.3 mol) of α,α'-azobis isobutyronitrile (AIBN) and 300 ml of ethyl acetate. After decreasing the inside pressure (100 mmHg) on ice bath, $N_2$ was introduced, and the inside pressure was decreased again. Thereafter, 588 g (3.0 mol) of $CF_3I$ was introduced and the mixture was slowly heated up to 60° C. After completion of the reaction, the reaction solution was cooled and washed with 1 mol/liter of an aqueous solution of HCl for separation of the solution. After that, refining by distillation was carried out, and 533 g (2.1 mol) of a fluorine-containing iodide (a):

was obtained.

Next, into a 200 ml four-necked flask were poured 60.1 g (0.24 mol) of the fluorine-containing iodide (a), 20 g (0.36 mol) of KOH and 100 ml of $H_2O$, followed by four-hour stirring at 60° C. After completion of the reaction, the reaction solution was washed with 1 mol/liter of an aqueous solution of HCl for separation of the solution. After that, refining by distillation was carried out, and 20 g (0.16 mol) of a fluorine-containing epoxide (b1):

was obtained.

Next, into a 500 ml autoclave were poured 44.9 g (0.37 mol) of the obtained fluorine-containing epoxide (b1), 4.52 g (52 mmol) of LiBr and 200 ml of N-methyl-2-pyrrolidone. After decreasing the inside pressure (100 mmHg) on ice bath, $CO_2$ was introduced. Thereafter, while heating up to 100° C., $CO_2$ was introduced until the inside pressure reached 1.2 MPa, and reaction was continued with stirring until decreasing of the inside pressure stopped. After completion of the reaction, the reaction solution was cooled and washed with 1 mol/liter of an aqueous solution of HCl for separation of the solution. After that, refining by distillation was carried out, and 41.1 g (0.22 mol) of a fluorine-containing cyclic carbonate (A2):

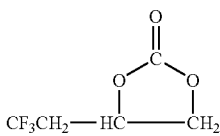

was obtained (yield 62%).

According to $^{19}$F-NMR and $^{1}$H-NMR analysis, it was confirmed that this product was the fluorine-containing cyclic carbonate (A2) having the above-mentioned structure.

$^{19}$F-NMR: (neat): −162.8 ppm (3F)
$^{1}$H-NMR: (neat): 2.75 to 3.01 ppm (2H), 4.30 to 4.37 ppm (1H), 4.74 to 4.81 ppm (1H), 5.13 to 5.21 ppm (1H)
IR: (KBr): 1,805 cm$^{-1}$ The fluorine content of this fluorine-containing cyclic carbonate (A2) was 30.6% by mass.

Synthesis Example 3

Component A3

Into a 500 ml autoclave were poured 93 g (0.62 mol) of pentafluoropropanol:

173 g (1.87 mol) of epichlorohydrine, 52 g (0.93 mol) of KOH and 6 ml of H$_2$O. While cooling the reactor of the autoclave with ice, the mixture was stirred, and when heat generation was stopped, the reaction was terminated. After completion of the reaction, the reaction solution was washed with 1 mol/liter of an aqueous solution of HCl for separation of the solution. After that, refining by distillation was carried out, and 98 g (0.47 mol) of a fluorine-containing epoxide (b2):

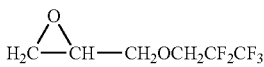

was obtained.

Next, into a 500 ml autoclave were poured 214 g (1.04 mol) of the obtained epoxide, 4.52 g (52 mmol) of LiBr and 200 ml of N-methyl-2-pyrrolidone. After decreasing the inside pressure (100 mmHg) on ice bath, CO$_2$ was introduced. Thereafter, while heating up to 100° C., CO$_2$ was introduced until the inside pressure reached 1.2 MPa, and reaction was continued with stirring until decreasing of the inside pressure stopped. After completion of the reaction, the reaction solution was cooled and washed with 1 mol/liter of an aqueous solution of HCl for separation of the solution. After that, refining by distillation was carried out, and 130 g (0.52 mol) of a fluorine-containing cyclic carbonate (A3):

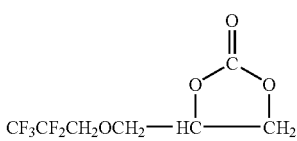

was obtained (yield 50%).

According to $^{19}$F-NMR and $^{1}$H-NMR analysis, it was confirmed that this product was the fluorine-containing cyclic carbonate (A3) having the above-mentioned structure.

$^{19}$F-NMR: (neat): −84.0 ppm (3F), −123.5 ppm (2F)
$^{1}$H-NMR: (neat): 3.92 to 4.05 ppm (2H), 4.17 to 4.27 ppm (2H), 4.36 to 4.42 ppm (1H), 4.59 to 4.66 ppm (1H), 4.98 to 5.06 ppm (1H)
IR: (KBr): 1,820 cm$^{-1}$ The fluorine content of this fluorine-containing cyclic carbonate (A3) was 38.0% by mass.

Synthesis Example 4

Component B1a

Into a 3-liter autoclave were poured 84 g (1.35 mol) of KOH, 800 ml of H$_2$O and 600 g (4.5 mol) of 2,2,3,3-tetrafluoropropanol:

Then, 681 g (4.5 mol) of hexafluoropropene:

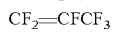

was introduced thereto. After completion of the reaction, the reaction solution was separated into two layers, and the lower layer was washed with water three times to separate the solution. After that, refining by distillation was carried out, and 1,015 g (3.6 mol) of a fluorine-containing chain ether (B1a):

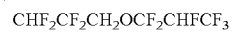

was obtained (yield 80%).

According to $^{19}$F-NMR and $^{1}$H-NMR analysis, it was confirmed that this product was the fluorine-containing chain ether (B1a) having the above-mentioned structure.

$^{19}$F-NMR: (neat): −77.8 ppm (3F), −83.6 to −88.7 ppm (2F), −128.9 ppm (2F), −143.0 ppm (2F), −215.2 ppm (1F)
$^{1}$H-NMR: (neat): 3.62 to 3.95 ppm (2H), 4.31 to 4.49 ppm (1H), 5.03 to 5.62 ppm (1H)

The fluorine content of this fluorine-containing chain ether (B1a) was 67.4% by mass.

Synthesis Example 5

Component B1b

Into a 3-liter autoclave were poured 84 g (1.35 mol) of KOH, 800 ml of H$_2$O and 675 g (4.5 mol) of hexafluoropropanol:

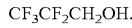

Then, 681 g (4.5 mol) of hexafluoropropene:

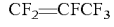

was introduced thereto. After completion of the reaction, the reaction solution was separated into two layers, and the lower layer was washed with water three times to separate the solution. After that, refining by distillation was carried out, and 1,080 g (3.6 mol) of a fluorine-containing chain ether (B1b):

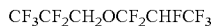

was obtained (yield 83%).

According to $^{19}$F-NMR and $^{1}$H-NMR analysis, it was confirmed that this product was the fluorine-containing chain ether (B1b) having the above-mentioned structure.

$^{19}$F-NMR: (neat): −69.9 ppm (3F), −76.1 to −76.7 ppm (3F), −78.3 to −79.1 ppm (2F), −118.4 ppm (2F), −206.6 ppm (1F)
$^{1}$H-NMR: (neat): 4.50 to 4.71 ppm (2H), 4.82 to 5.07 ppm (1H)

The fluorine content of this fluorine-containing chain ether (B1b) was 69.6% by mass.

Synthesis Example 6

Component B2a

Into a 2-liter four-necked flask was poured 500 g (2.38 mol) of trifluoroacetic anhydride:

$(CF_3CO)_2O$ under nitrogen atmosphere, and 394 g (2.86 mol) of 2,2,3,3-tetrafluoropropanol:

$CHF_2CF_2CH_2OH$ was added thereto little by little at 40° C. under refluxing with a dropping funnel. When the adding amount of 2,2,3,3-tetrafluoropropanol reached 1.2 equivalents, reaction was carried out at 80° C. for 0.5 hour. After completion of the reaction, the inside of the flask was brought to room temperature, washing with water was repeated and refining by distillation was conducted to obtain 488 g (2.19 mol) of a fluorine-containing chain ester (B2a):

$CF_3COOCH_2CF_2CHF_2$ (yield 92%).

According to $^{19}$F-NMR, $^1$H-NMR and IR analysis, it was confirmed that this product was the fluorine-containing chain ester (B2a) having the above-mentioned structure.

$^{19}$F-NMR: (neat): −76.63 ppm (3F), −125.23 to −125.280 ppm (2F), −138.74 to −138.99 ppm (2F)

$^1$H-NMR: (neat): 3.29 to 3.48 ppm (2H), 4.38 to 4.81 ppm (1H)

IR: (KBr): 1,805 cm$^{-1}$

The fluorine content of this fluorine-containing ester (B2a) was 58.31% by mass.

Synthesis Example 7

Component B2b

Into a 2-liter four-necked flask was poured 500 g (2.38 mol) of trifluoroacetic anhydride:

$(CF_3CO)_2O$ under nitrogen atmosphere, and 428 g (2.86 mol) of pentafluoropropanol:

$CF_3CF_2CH_2OH$ was added thereto little by little at 40° C. under refluxing with a dropping funnel. When the adding amount of pentafluoropropanol reached 1.2 equivalents, reaction was carried out at 80° C. for 0.5 hour. After completion of the reaction, the inside of the flask was brought to room temperature, washing with water was repeated and refining by distillation was conducted to obtain 509 g (2.07 mol) of a fluorine-containing chain ester (B2b):

$CF_3COOCH_2CF_2CF_3$ (yield 87%).

According to $^{19}$F-NMR, $^1$H-NMR and IR analysis, it was confirmed that this product was the fluorine-containing chain ester (B2b) having the above-mentioned structure.

$^{19}$F-NMR: (neat): −69.57 to −70.68 ppm (3F), −78.79 to −79.7 ppm (3F), −118.3 to −121.34 ppm (2F)

$^1$H-NMR: (neat): 4.207 to 4.298 ppm (2H)

IR: (KBr): 1,809 cm$^{-1}$

The fluorine content of this fluorine-containing chain ester (B2b) was 61.7% by mass.

Synthesis Example 8

Component B3a

Into a 3-liter four-necked flask was poured 300 g (3.00 mol) of trifluoroethanol:

$CF_3CH_2OH$ under nitrogen atmosphere, and subsequently 355 g (1.5 equivalent: 3.0 mol) of pyridine and 600 ml of tetraglyme as a solvent were added thereto, followed by stirring on ice bath. Then, a tetraglyme solution of 150 g (0.57 mol) of triphosgene:

$CCl_3OCOOCCl_3$ was added thereto little by little over four hours with a dropping funnel. The reaction temperature was adjusted to be maintained at 10° C. After completion of the reaction, the inside of the flask was brought to room temperature, separation of the solution with 1N hydrochloric acid was carried out three times and refining of the lower layer by distillation was conducted to obtain 270 g (2.19 mol) of a fluorine-containing chain carbonate (B3a):

$CF_3CH_2OCOOCH_2CF_3$ (yield 40%). The boiling point of this product was 103° C. (760 mmHg).

According to $^{19}$F-NMR, $^1$H-NMR and IR analysis, it was confirmed that this product was the fluorine-containing chain carbonate (B3a).

$^{19}$F-NMR: (neat): −82.3 (3F)

$^1$H-NMR: (neat): 3.91 to 3.98 ppm (2H)

IR: (KBr): 1,784 cm$^{-1}$

The fluorine content of this fluorine-containing chain carbonate (B3a) was 50.42% by mass.

Synthesis Example 9

Component B3b

Into a 2-liter four-necked flask was poured 150 g (1.00 mol) of pentafluoropropanol:

$CF_3CF_2CH_2OH$ under nitrogen atmosphere, and subsequently 119 g (1.5 equivalent: 1.5 mol) of pyridine and 200 ml of tetraglyme as a solvent were added thereto, followed by stirring on ice bath. Then, a tetraglyme solution of 50 g (0.17 mol) of triphosgene:

$CCl_3OCOOCCl_3$ was added thereto little by little over 1.5 hours with a dropping funnel. The reaction temperature was adjusted to be maintained at 10° C. After completion of the reaction, the inside of the flask was brought to room temperature, separation of the solution with 1N hydrochloric acid was carried out three times and refining of the lower layer by distillation was conducted to obtain 100 g (2.19 mol) of a fluorine-containing chain carbonate (B3b):

$CF_3CF_2CH_2OCOOCH_2CF_2CF_3$ (yield 30%). The boiling point of this product was 65° C. (200 mmHg).

According to $^{19}$F-NMR, $^1$H-NMR and IR analysis, it was confirmed that this product was the fluorine-containing carbonate (B3b).

$^{19}$F-NMR: (neat): −84.27 to −85.39 (3F), −124.36 to −125.36 ppm (2F)

$^1$H-NMR: (neat): 3.67 to 4.24 ppm (2H)

IR: (KBr): 1,784 cm$^{-1}$

The fluorine content of this fluorine-containing chain carbonate (B3b) was 58.26% by mass.

Synthesis Example 10

Component B3c

Into a 2-liter four-necked flask was poured 140 g (1.00 mol) of 2,2,3,3-tetrafluoropropanol:

$CHF_2CF_2CH_2OH$ under nitrogen atmosphere, and subsequently 119 g (1.5 equivalent: 1.5 mol) of pyridine and 300 ml of tetraglyme as a solvent were added thereto, followed by stirring on ice bath. Then, a tetraglyme solution of 50 g (0.17 mol) of triphosgene:

$CCl_3OCOOCCl_3$ was added thereto little by little over two hours with a dropping funnel. The reaction temperature was adjusted to be maintained at 10° C. After completion of the reaction, the inside of the flask was brought to room temperature, separation of the solution with 1N hydrochloric acid was carried out three times and refining of the lower layer by distillation was conducted to obtain 150 g (0.52 mol) of a fluorine-containing chain carbonate (B3c):

$CHF_2CF_2CH_2OCOOCH_2CF_2CHF_2$ (yield 34%). The boiling point of this product was 105° C. (100 mmHg).

According to $^{19}$F-NMR, $^1$H-NMR and IR analysis, it was confirmed that this product was the fluorine-containing chain carbonate (B3c).

$^{19}$F-NMR: (neat): −124.61 to −124.710 ppm (2F), −137.74 to −138.69 ppm (2F) $^1$H-NMR: (neat): 3.26 to 3.36 ppm (2H), 4.45 to 4.89 ppm (1H)

IR: (KBr): 1,787 cm$^{-1}$

The fluorine content of this fluorine-containing chain carbonate (B3c) was 52.89% by mass.

Next, examples of the secondary battery using a non-aqueous electrolytic solution are explained below, but the present invention is not limited to them.

Compounds used in the following examples and comparative examples are as follows.

Component (A)
(A1): $CF_3$ carbonate (Synthesis Example 1)

$CF_3$—HC—CH$_2$ (with O-C(=O)-O ring)

(A2): $CF_3CH_2$ carbonate (Synthesis Example 2)

$CF_3CH_2$—HC—CH$_2$ (with O-C(=O)-O ring)

(A3): $CF_3CF_2CH_2OCH_2$ carbonate (Synthesis Example 3)

$CF_3CF_2CH_2OCH_2$—HC—CH$_2$ (with O-C(=O)-O ring)

Component (B)
(B1a): $CHF_2CF_2CH_2OCF_2CHFCF_3$ (Synthesis Example 4)
(B1b): $CF_3CF_2CH_2OCF_2CHFCF_3$ (Synthesis Example 5)
(B2a): $CF_3COOCH_2CF_2CHF_2$ (Synthesis Example 6)
(B2b): $CF_3COOCH_2CF_2CF_3$ (Synthesis Example 7)
(B3a): $CF_3CH_2OCOOCH_2CF_3$ (Synthesis Example 8)
(B3b): $CF_3CF_2CH_2OCOOCH_2CF_2CF_3$ (Synthesis Example 9)
(B3c): $CHF_2CF_2CH_2OCOOCH_2CF_2CHF_2$ (Synthesis Example 10)

Component (C)
(C1a): $CF_3CF_2CH_2$ lactone $CF_3CF_2CH_2$—HC—CH$_2$ (with O-C(=O) ring)

(Cb1): $CF_3CH_2$ lactone $CF_3CH_2$—HC—CH$_2$ (with O-C(=O) ring)

(C2a): Monofluorobenzene
(C2b): Hexafluorobenzene
(C3): 1F-sulfolane (F-substituted sulfolane structure)

Component (D)
(D1) Dimethyl carbonate
(D2) Diethyl carbonate

Example 1

$CF_3$ carbonate (A1) as the Component (A) was mixed to $CHF_2CF_2CH_2OCOOCH_2CHFCF_3$ (B1a) as the Component (B) in a percent by volume ratio of 30/70, and to this solvent for dissolving an electrolyte salt was further added LiN($SO_2CF_2CF_3$)$_2$ as the electrolyte salt to give a concentration of 0.8 mol/liter, followed by sufficient stirring at 25° C. to prepare the electrolytic solution of the present invention.

Examples 2 to 33

The Component (A), Component (B) and Component (C) were mixed in the formulation shown in Tables 1 and 2 and the electrolyte salt was further added to this solvent for dissolving an electrolyte salt in the same manner as in Example 1 to prepare the electrolytic solution of the present invention.

Comparative examples 1 to 4

The Component (A1) and Component (D) were mixed in the formulation shown in Tables 1 and 2 and LiN(SO$_2$CF$_2$CF$_3$)$_2$ as the electrolyte salt was further added to this solvent for dissolving an electrolyte salt in the same manner as in Example 1 to prepare an electrolytic solution.

Test 1

Stability of Electrolytic Solution at Low Temperature 6 ml of the electrolytic solutions prepared in Examples 1 to 20 and Comparative Examples 1 and 2 were poured in a 9 ml sample bottle, and allowed to stand at −30° C. for eight hours, and the state of the solutions was observed with naked eyes. The results are shown in Table 1.
(Criteria for Evaluation)
○: Electrolytic solution is a homogeneous solution.
X: Electrolytic solution is solidified.
(Preparation of Cylindrical Lithium Secondary Battery (1))

Cylindrical lithium secondary battery (1) was prepared according to the following method using the electrolytic solutions prepared in Examples 1 to 20 and Comparative Examples 1 and 2.
<Preparation of Positive Electrode Using Lithium Manganate>

An active material for a positive electrode prepared by mixing LiMnO$_2$, carbon black and polyvinylidene fluoride (trade name KF-1000 available from KUREHA CORPORATION) in a ratio of 85/7/8 (mass percent ratio) was dispersed in N-methyl-2-pyrrolidone to be formed into a slurry which was then uniformly coated on a positive electrode current collector (15 μm thick aluminum foil) and dried to form a layer made of a mixture of positive electrode materials. Then, the coated aluminum foil was subjected to compression molding with a roller press, and after cutting and drying, a lead wire was welded thereto to prepare a strip-like positive electrode of lithium manganate.
<Preparation of Negative Electrode>

A styrene-butadiene rubber dispersed in distilled water was added to artificial graphite powder (trade name KS-44 available from TIMCAL) to give a solid content of 6% by mass, followed by mixing with a disperser to be formed into a slurry which was then uniformly coated on a negative electrode current collector (10 μm thick copper foil) and dried to form a layer made of a mixture of negative electrode materials. Then, the coated copper foil was subjected to compression molding with a roller press, and after cutting and drying, a lead wire was welded thereto to prepare a strip-like positive electrode.

The above-mentioned strip-like positive electrode was laid on the above-mentioned strip-like negative electrode with a 20 μm thick microporous polyethylene film being interposed between them, followed by winding up spirally to prepare a laminated electrode having a spirally wound up structure. In that case, winding up is carried out so that the outer surface of the wound-up electrode was a rough end surface of the positive electrode current collector. Then, this electrode was put in a cylindrical battery case having an outer diameter of 18 mm and a bottom plate, and lead wires of the positive electrode and negative electrode were welded.

Next, the electrolytic solutions prepared in Examples 1 to 20 and Comparative Examples 1 and 2 were injected into the battery case, and after the electrolytic solution had been sufficiently penetrated in the separator, etc., sealing, preliminary charging and aging were carried out to prepare the cylindrical lithium secondary battery (1).

Test 2

Safety

The following four safety tests were carried out by using the prepared cylindrical lithium secondary battery (1).
[Pin Piercing Test]

After charging the cylindrical battery up to 4.3 V, a pin of 0.3 mm diameter is pierced through the center of the cylindrical battery, and whether firing or bursting of the cylindrical battery occurs is examined. The results are shown in Table 1.
[Heating Test]

After charging the cylindrical battery up to 4.25 V, it is heated up to 170° C. from room temperature at a rate of 5° C./min, and is allowed to stand at 170° C. Whether firing or bursting of the cylindrical battery occurs is examined. The results are shown in Table 1.
[Short-Circuit Test]

After charging the cylindrical battery up to 4.4 V, the positive electrode and the negative electrode are subjected to short-circuit with a copper wire to check to see if firing or bursting of the cylindrical battery occurs. The results are shown in Table 1.
[Over-Charge Test]

The cylindrical battery is discharged up to 3.0 V at a current corresponding to 1 CmA, and then is subjected to over-charging at a current corresponding to 3 CmA up to an upper limit voltage of 12 V, and whether firing or bursting of the laminated cell occurs is examined. The results are shown in Table 1.

In any of the tests, when no firing (bursting) occurs, it is shown by ○, and when firing (bursting) occurs, it is shown by X.

TABLE 1

| Solvents | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Component (A) | | | | | | | | | | | | | |
| Kind | A1 | A1 | A1 | A1 | A1 | A1 | A1 | A1 | A1 | A2 | A2 | A3 | A3 |
| Ratio (% by volume) | 30 | 30 | 30 | 30 | 30 | 30 | 30 | 40 | 20 | 30 | 30 | 30 | 30 |
| Component (B) | | | | | | | | | | | | | |
| Kind | B1a | B1b | B2a | B2b | B3a | B3b | B3c | B1a | B1a | B1a | B1a | B3b | B3c |
| Ratio (% by volume) | 70 | 70 | 70 | 70 | 70 | 70 | 70 | 60 | 80 | 70 | 70 | 70 | 70 |

TABLE 1-continued

| | | | | | | | | | | | | | |
|---|---|---|---|---|---|---|---|---|---|---|---|---|---|
| Component (C) | | | | | | | | | | | | | |
| Kind | — | — | — | — | — | — | — | — | — | — | — | — | — |
| Ratio (% by volume) | — | — | — | — | — | — | — | — | — | — | — | — | — |
| Component (D) | | | | | | | | | | | | | |
| Kind | — | — | — | — | — | — | — | — | — | — | — | — | — |
| Ratio (% by volume) | — | — | — | — | — | — | — | — | — | — | — | — | — |
| Electrolyte salt (Concentration [mol/liter]) | | | | | | | | | | | | | |
| $LiN(SO_2CF_2CF_3)_2$ | 0.8 | 0.8 | 0.8 | 0.8 | 0.8 | 0.8 | 0.8 | 0.8 | 0.8 | — | — | 0.8 | 0.8 |
| $LiN(SO_2CF_3)_2$ | — | — | — | — | — | — | — | — | — | — | 0.8 | — | — |
| $LiPF_6$ | — | — | — | — | — | — | — | — | — | 0.8 | — | — | — |
| Stability at low temperature | ○ | ○ | ○ | ○ | ○ | ○ | ○ | ○ | ○ | ○ | ○ | ○ | ○ |
| Safety test | | | | | | | | | | | | | |
| Pin piercing test | ○ | ○ | ○ | ○ | ○ | ○ | ○ | ○ | ○ | ○ | ○ | ○ | ○ |
| Heating test | ○ | ○ | ○ | ○ | ○ | ○ | ○ | ○ | ○ | ○ | ○ | ○ | ○ |
| Short-circuit test | ○ | ○ | ○ | ○ | ○ | ○ | ○ | ○ | ○ | ○ | ○ | ○ | ○ |
| Over-charge test | ○ | ○ | ○ | ○ | ○ | ○ | ○ | ○ | ○ | ○ | ○ | ○ | ○ |

| | Example | | | | | | | Com. Ex. | |
|---|---|---|---|---|---|---|---|---|---|
| Solvents | 14 | 15 | 16 | 17 | 18 | 19 | 20 | 1 | 2 |
| Component (A) | | | | | | | | | |
| Kind | A1 | A1 | A3 | A3 | A3 | A3 | A3 | A1 | A1 |
| Ratio (% by volume) | 30 | 30 | 25 | 25 | 25 | 25 | 25 | 30 | 30 |
| Component (B) | | | | | | | | | |
| Kind | B1a + B2b | B1a + B3b | B3c | B3c | B3c | B3c | B3c | — | — |
| Ratio (% by volume) | 30 + 40 | 30 + 40 | 60 | 60 | 72 | 72 | 60 | — | — |
| Component (C) | | | | | | | | | |
| Kind | — | — | C1a | C1b | C2a | C2b | C3 | — | — |
| Ratio (% by volume) | — | — | 15 | 15 | 3 | 3 | 15 | — | — |
| Component (D) | | | | | | | | | |
| Kind | — | — | — | — | — | — | — | D1 | D2 |
| Ratio (% by volume) | — | — | — | — | — | — | — | 70 | 70 |
| Electrolyte salt (Concentration [mol/liter]) | | | | | | | | | |
| $LiN(SO_2CF_2CF_3)_2$ | 0.8 | 0.8 | 0.8 | 0.8 | 0.8 | 0.8 | 0.8 | 0.8 | 0.8 |
| $LiN(SO_2CF_3)_2$ | — | — | — | — | — | — | — | — | — |
| $LiPF_6$ | — | — | — | — | — | — | — | — | — |
| Stability at low temperature | ○ | ○ | ○ | ○ | ○ | ○ | ○ | X | ○ |
| Safety test | | | | | | | | | |
| Pin piercing test | ○ | ○ | ○ | ○ | ○ | ○ | ○ | X | X |
| Heating test | ○ | ○ | ○ | ○ | ○ | ○ | ○ | X | X |
| Short-circuit test | ○ | ○ | ○ | ○ | ○ | ○ | ○ | X | X |
| Over-charge test | ○ | ○ | ○ | ○ | ○ | ○ | ○ | X | X |

As it is seen from Table 1, in any of the tests such as the pin piercing test, heating test, short-circuit test and over-charge test, the batteries of Comparative Examples were subject to firing, but in the batteries of Examples, firing and bursting were not seen in all the tests. In Comparative Example 1, the electrolytic solution was solidified at low temperature of −30° C.

(Preparation of Cylindrical Lithium Secondary Battery (2))

Cylindrical lithium secondary battery (2) was prepared according to the following method using the electrolytic solutions prepared in Examples 21 to 33 and Comparative Examples 3 and 4. The cylindrical lithium secondary battery (2) was prepared according to the procedures for preparing the cylindrical lithium secondary battery (1) except the positive electrode.

<Preparation of Positive Electrode Using Lithium Nickel Dioxide>

An active material for a positive electrode prepared by mixing $LiNiO_2$, carbon black and fluorine-containing resin (trade name Teflon (registered trade mark) 30-J available from DU PONT-MITSUI POLYCHEMICALS) in a ratio of 88/6/6 (% by mass ratio) was dispersed in N-methyl-2-pyrrolidone to be formed into a slurry which was then uniformly coated on a positive electrode current collector (15 μm thick aluminum foil) and dried to form a layer made of a mixture of positive electrode materials. Then, the coated aluminum foil was subjected to compression molding with a roller press, and after cutting, a lead wire was welded thereto to prepare a strip-like positive electrode.

Test 3

Safety

The safety tests such as the pin piercing test, heating test, short-circuit test and over-charge test were carried out in the same manner as in the above-mentioned Test 2.

The results are shown in Table 2.

TABLE 2

| Solvents | Example |  |  |  |  |  |  |  |  |
|---|---|---|---|---|---|---|---|---|---|
| | 21 | 22 | 23 | 24 | 25 | 26 | 27 | 28 | 29 |
| Component (A) | | | | | | | | | |
| Kind | A1 | A1 | A1 | A1 | A1 | A2 | A2 | A3 | A3 |
| Ratio (% by volume) | 30 | 30 | 30 | 40 | 20 | 30 | 30 | 30 | 30 |
| Component (B) | | | | | | | | | |
| Kind | B1a | B2b | B3a | B1a | B1a | B1a | B1a | B3b | B3c |
| Ratio (% by volume) | 70 | 70 | 70 | 60 | 80 | 70 | 70 | 70 | 70 |
| Component (C) | | | | | | | | | |
| Kind | — | — | — | — | — | — | — | — | — |
| Ratio (% by volume) | — | — | — | — | — | — | — | — | — |
| Component (D) | | | | | | | | | |
| Kind | — | — | — | — | — | — | — | — | — |
| Ratio (% by volume) | — | — | — | — | — | — | — | — | — |
| Electrolyte salt (Concentration [mol/liter]) | | | | | | | | | |
| $LiN(SO_2CF_2CF_3)_2$ | 0.8 | 0.8 | 0.8 | 0.8 | 0.8 | — | — | 0.8 | 0.8 |
| $LiN(SO_2CF_3)_2$ | — | — | — | — | — | — | 0.8 | — | — |
| $LiPF_6$ | — | — | — | — | — | 0.8 | — | — | — |
| Safety test | | | | | | | | | |
| Pin piercing test | ○ | ○ | ○ | ○ | ○ | ○ | ○ | ○ | ○ |
| Heating test | ○ | ○ | ○ | ○ | ○ | ○ | ○ | ○ | ○ |
| Short-circuit test | ○ | ○ | ○ | ○ | ○ | ○ | ○ | ○ | ○ |
| Over-charge test | ○ | ○ | ○ | ○ | ○ | ○ | ○ | ○ | ○ |

| Solvents | Example |  |  |  | Com. Ex. |  |
|---|---|---|---|---|---|---|
| | 30 | 31 | 32 | 33 | 3 | 4 |
| Component (A) | | | | | | |
| Kind | A1 | A3 | A3 | A3 | A1 | A1 |
| Ratio (% by volume) | 30 | 25 | 25 | 25 | 30 | 30 |
| Component (B) | | | | | | |
| Kind | B1a + B2b | B3c | B3c | B3c | — | — |
| Ratio (% by volume) | 30 + 40 | 60 | 72 | 60 | — | — |
| Component (C) | | | | | | |
| Kind | — | C1b | C2a | C3 | — | — |
| Ratio (% by volume) | — | 15 | 3 | 15 | — | — |
| Component (D) | | | | | | |
| Kind | — | — | — | — | D1 | D2 |
| Ratio (% by volume) | — | — | — | — | 70 | 70 |
| Electrolyte salt (Concentration [mol/liter]) | | | | | | |
| $LiN(SO_2CF_2CF_3)_2$ | 0.8 | 0.8 | 0.8 | 0.8 | 0.8 | 0.8 |
| $LiN(SO_2CF_3)_2$ | — | — | — | — | — | — |
| $LiPF_6$ | — | — | — | — | — | — |
| Safety test | | | | | | |
| Pin piercing test | ○ | ○ | ○ | ○ | X | X |
| Heating test | ○ | ○ | ○ | ○ | X | X |
| Short-circuit test | ○ | ○ | ○ | ○ | X | X |
| Over-charge test | ○ | ○ | ○ | ○ | X | X |

As it is seen from Table 2, even if the active material for the positive electrode is changed to one mainly comprising lithium nickel dioxide, in Examples, firing and bursting did not occur in all the tests, but in Comparative Examples, firing and bursting occurred in all the tests.

INDUSTRIAL APPLICABILITY

The present invention can provide a non-aqueous electrolytic solution having more excellent noncombustibility and being suitable for a lithium secondary battery required to have especially high safety and acid resistance since it comprises an electrolyte salt and a solvent for dissolving an electrolyte salt comprising a specific fluorine-containing cyclic carbonate and a specific fluorine-containing solvent.

The invention claimed is:

1. A non-aqueous electrolytic solution comprising:
    (I) a solvent for dissolving an electrolyte salt comprising
        (A) a fluorine-containing cyclic carbonate represented by the formula (A1):

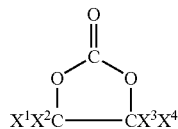
(A1)

wherein $X^1$ is —$CF_3$—$CH_2CF_3$ or —$CH_2OCH_2CF_2CF_3$; and $X^2$, $X^3$ and $X^4$ each is —H, and
    (B3) a fluorine-containing chain carbonate, and
    (C) at least one fluorine-containing solvent selected from the group consisting of (C1) a fluorine-containing lactone, (C2) at least one fluorine-containing solvent selected from the group consisting of monofluorobenzene, hexafluorobenzene, difluorobenzene, trifluorobenzene, tetrafluorobenzene and pentafluorobenzene and (C3) a fluorine-containing sulfolane derivative, and
    (II) an electrolyte salt, and
    wherein the solvent (I) for dissolving an electrolyte salt comprises 10 to 60% by volume of the fluorine-containing cyclic carbonate (A), 40 to 90% by volume of the fluorine-containing chain carbonate (B3) and 0.5 to 20% by volume of fluorine-containing solvent (C), based on the whole solvent (I).

2. The non-aqueous electrolytic solution of claim 1, wherein the fluorine-containing solvent (B3) is a fluorine-containing chain carbonate (B3) represented by the formula (B3):

$$R^5OCOOR^6$$

wherein $R^5$ and $R^6$ are the same or different, each is an alkyl group or fluorine-containing alkyl group having 1 to 4 carbon atoms, at least either $R^5$ or $R^6$ is a fluorine-containing alkyl group.

3. The non-aqueous electrolytic solution of claim 1, wherein the electrolyte salt (II) is at least one selected from the group consisting of $LiPF_6$, $LiN(SO_2CF_3)_2$ and $LiN(SO_2CF_2CF_3)_2$.

4. The non-aqueous electrolytic solution of claim 1, wherein the non-aqueous electrolytic solution is for lithium secondary batteries.

5. The non-aqueous electrolytic solution of claim 1, wherein the non-aqueous electrolytic solution is for large size lithium secondary batteries used for hybrid cars and distributed power source.

6. A lithium secondary battery comprising a positive electrode, a negative electrode, a separator and the non-aqueous electrolytic solution of claim 1, wherein an active material used on the positive electrode is at least one lithium compound oxide selected from the group consisting of lithium cobalt compound oxides, lithium nickel compound oxides, lithium manganese compound oxides, iron compound oxides and lithium vanadium compound oxides.

* * * * *